(12) United States Patent
Sawyer et al.

(10) Patent No.: US 7,849,180 B2
(45) Date of Patent: Dec. 7, 2010

(54) LOAD BALANCED STORAGE PROVISIONING

(75) Inventors: Darren Charles Sawyer, San Carlos, CA (US); Kesari Mishra, Santa Clara, CA (US); Swaminathan Ramany, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 220 days.

(21) Appl. No.: 12/111,712

(22) Filed: Apr. 29, 2008

(65) Prior Publication Data

US 2009/0271485 A1 Oct. 29, 2009

(51) Int. Cl.
*G06F 15/173* (2006.01)

(52) U.S. Cl. .................. 709/223; 709/224; 709/225; 709/226; 711/100; 711/170; 718/105

(58) Field of Classification Search .......... 709/223, 709/224, 225, 226; 718/105; 711/100, 170
See application file for complete search history.

(56) References Cited

U.S. PATENT DOCUMENTS

| | | | |
|---|---|---|---|
| 5,668,986 A * | 9/1997 | Nilsen et al. | 707/10 |
| 7,526,540 B2 * | 4/2009 | Gopisetty et al. | 709/223 |
| 2003/0005119 A1 * | 1/2003 | Mercier et al. | 709/225 |
| 2004/0103195 A1 * | 5/2004 | Chalasani et al. | 709/226 |
| 2005/0114480 A1 * | 5/2005 | Ramamoorthy | 709/220 |
| 2005/0172073 A1 * | 8/2005 | Voigt et al. | 711/114 |
| 2005/0256971 A1 * | 11/2005 | Colrain et al. | 709/238 |
| 2006/0095656 A1 * | 5/2006 | Ueoka et al. | 711/111 |
| 2007/0150690 A1 * | 6/2007 | Chen et al. | 711/170 |
| 2007/0226348 A1 | 9/2007 | Grabarnik et al. | |
| 2009/0172272 A1 * | 7/2009 | Yamane et al. | 711/112 |
| 2009/0248980 A1 * | 10/2009 | Hashimoto et al. | 711/114 |

FOREIGN PATENT DOCUMENTS

| | | |
|---|---|---|
| WO | WO 2006/020338 A1 | 2/2006 |
| WO | WO 2006020338 A1 * | 2/2006 |

OTHER PUBLICATIONS

Gupta, K., et al., "Mirage: Storage provisioning in large data centers using balanced component utilizations", ACM SIGOPS Operating Systems Review, vol. 42. No. 1m Jan. 2008, pp. 104-105, New York, NY, USA.
PCT International Search Report and Written Opinion for International Application No. PCT/US2009/039968 mailed Jul. 8, 2009, 14 pages.

* cited by examiner

*Primary Examiner*—Nathan Flynn
*Assistant Examiner*—Aftab Nasir Khan
(74) *Attorney, Agent, or Firm*—Blakely, Sokoloff, Taylor & Zafman LLP (57) ABSTRACT

Available performance capacities of storage servers and storage devices in a storage infrastructure are determined using a plurality of metrics, wherein each of the storage devices is managed by one of the storage servers. Each aggregate is hosted by a storage server and includes multiple storage devices. A relationship between the plurality of metrics is analyzed. An aggregate from which to allocate storage capacity to a volume from a plurality of aggregates is selected based on the available performance capacities and the relationship between the plurality of metrics. The selection is performed without information about properties of the volume. Storage capacity of the selected aggregate is automatically allocated to the volume. After said allocation, the plurality of aggregates is approximately load balanced.

20 Claims, 5 Drawing Sheets

LOAD BALANCED STORAGE PROVISIONING

TECHNICAL FIELD

Embodiments of the present invention relate to provisioning storage, and more specifically to provisioning storage in a load balanced manner.

BACKGROUND

Storage provisioning is a frequent and important Information Technology (IT) task in which a set of users, applications or workload entities are assigned to new or existing storage resources. Such assignment is preferably made in a manner to accommodate the storage capacity and traffic generated by the users, applications and workload entities. This involves assigning storage entities (called volumes herein) to storage containers (called aggregates herein) that are hosted on one or more systems.

Under conventional methodologies, the provisioning or assignment of new volumes is performed without considering the performance impact of the provisioned volumes on the systems hosting the aggregates. Nor do conventional methodologies consider utilization of resources that impact performance such as processor, memory, etc. Instead, in conventional methodologies for provisioning storage the assignment of volumes is performed purely on the basis of storage capacity in the aggregates (determination of whether there is enough space on an aggregate to assign a volume). This approach can lead to an unbalanced deployment, where some systems are heavily loaded while others are mostly idle. The heavily loaded systems are highly likely to perform poorly, and the mostly idle systems are highly likely to be underutilized.

SUMMARY

Embodiments of the present invention enable provisioning of virtual storage entities (volumes) with unknown performance properties to physical resources (e.g., aggregates) in a load balanced manner. A storage allocation system connected to a network manages allocation of storage space from aggregates. When a command to allocate storage space (e.g., to one or more new volumes) is received, the storage allocation system determines which aggregates are best suited to provide the storage space. Advantageously, embodiments of the present invention provision storage after taking into consideration resource utilizations and maximum performance capacities of the aggregates. This permits provisioning to be performed with improved efficiency, resulting in approximately load-balanced aggregates, even in the absence of information about the volumes.

Allocation of new volumes to aggregates can be performed in a single stage or in multiple stages.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

The present invention includes various operations and processes, which will be described below. The operations and processes of the present invention may be implemented by specially-designed hardware components (e.g., circuitry, dedicated logic, programmable logic, microcode, etc.) or may be implemented by a programmable hardware device executing machine-executable instructions (e.g., software). Alternatively, the operations may be performed by a combination of these approaches.

At least portions of the present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

Figure 1:
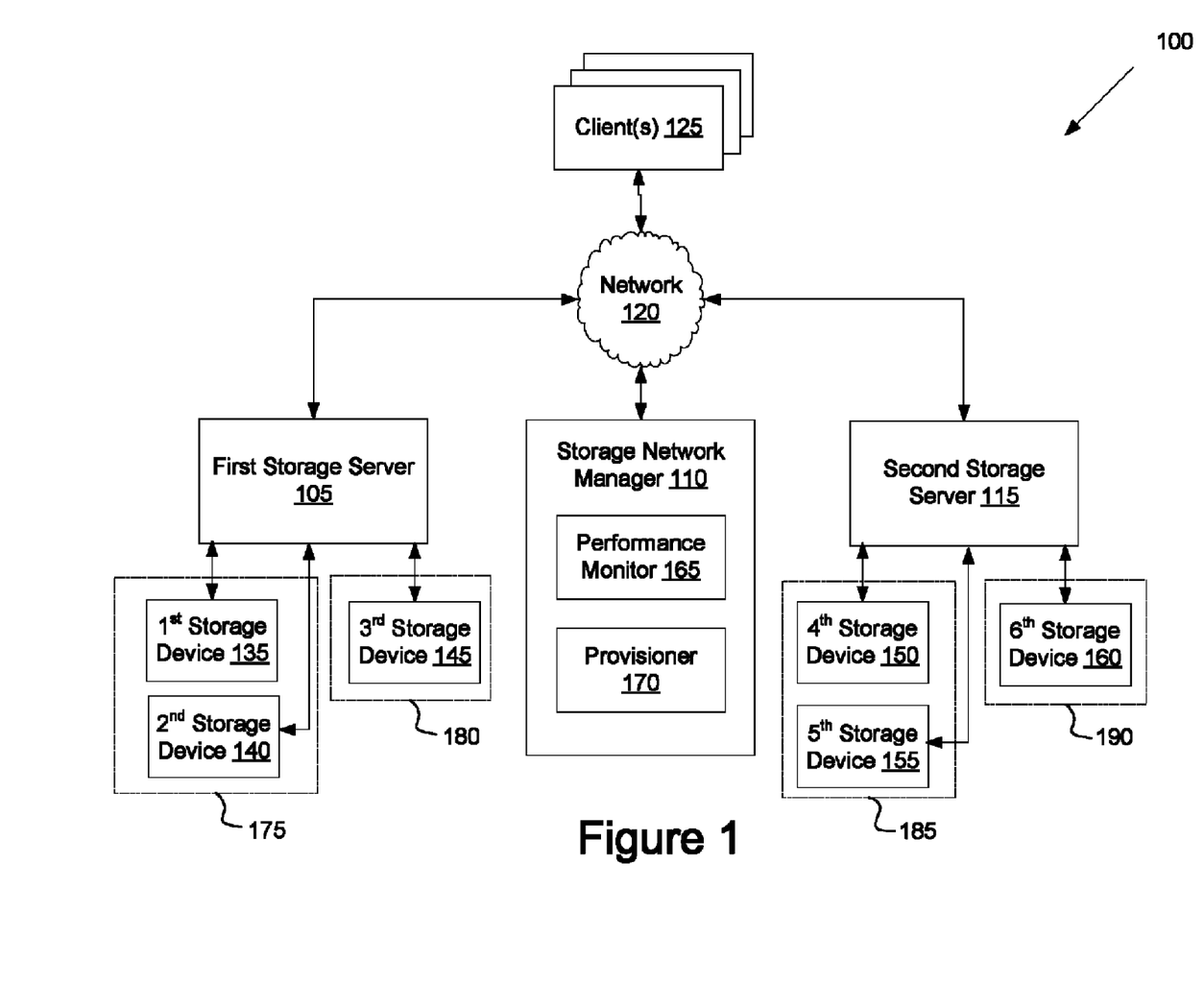
FIG. 1 illustrates an exemplary network architecture, in which embodiments of the present invention can operate.

FIG. 1 illustrates an exemplary network architecture 100, in which embodiments of the present invention can operate. The network architecture 100 includes a storage network manager 110 connected with a first storage server 105 and a second storage server 115 via a network 120, which may be a public network (e.g., the Internet) or a private network (e.g., a local area network (LAN), a wide area network (WAN), an intranet, etc.). One or more clients 125 are also connected with the first storage server 105, second storage server 115 and storage network manager 110 via the network 120. Though a first storage server 105 and second storage server 115 are shown, the network architecture 100 may include more or fewer storage servers.

The storage servers and storage devices together make up a storage infrastructure that provides storage to clients 125. Storage server 105 and second storage server 115 can provide file-level access (e.g., as provided by network attached storage (NAS)), block-level access (e.g., as provided by a storage area network (SAN)), or a combination of file-level access and block-level access to data stored on the storage devices. The storage servers 105, 115 each manage a separate storage subsystem that includes multiple storage devices. In the illustrated embodiment, first storage server 105 manages a first storage device 135, a second storage device 140 and a third storage device 145 and second storage server 115 manages a fourth storage device 150, a fifth storage device 155 and a sixth storage device 160.

Each of the storage devices may be a hard disk drive, a tape backup drive, an optical drive, or other storage medium. In one embodiment, storage servers divide the storage devices into aggregates. Each aggregate is a pool of storage space that can be assigned to volumes. In one embodiment, all storage devices in an aggregate are of the same type (e.g., all storage devices of the first aggregate 175 may be 7200 rotations per minute (RPM) serial advanced technology attachment (SATA) disk drives, all storage devices of the third aggregate 185 may be 15,000 RPM fiber channel arbitrated loop (FCAL) disk drives, etc.). Alternatively, different types of storage devices may be included in an aggregate (e.g., first aggregate 175 may include a 7200 RPM SATA disk drive and a 15,000 PRM FCAL disk drive). In the illustrated embodiment, the first storage server 105 manages a first aggregate 175 that includes the first disk drive 135 and the second disk drive 140 and a second aggregate 180 that includes the third disk drive 145. The second storage server 115 manages a third aggregate 185 that includes the fourth disk drive 150 and the fifth disk drive 155 and a fourth aggregate 190 that includes the sixth disk drive 160. The storage servers 105, 115 can make the managed aggregates available to clients 125 so that clients 125 can write data to and read data from the storage devices.

Clients 125 may include desktop computers, laptop computers, servers, terminals, and/or other computing systems. Clients 125 may routinely write data to and/or read data from specified portions of the storage devices called volumes. Each volume is a logical storage entity assigned to a specific aggregate. For example, a 50 gigabyte (GB) volume may be assigned to the first aggregate 175 (which may include the first disk drive having a 100 GB capacity and the second disk drive having a 100 GB capacity). The 50 GB volume may be distributed between the first storage device 135 and second storage device 140 evenly such that the first storage device 135 hosts 25 GB of storage for the volume and the second storage device 140 hosts 25 GB of storage for the volume. Alternatively, the portion of the volume that is hosted by each storage device in an aggregate may not be uniform. For example, the first storage device 135 may host 10 GB and the second storage device 140 may host 40 GB of a 50 GB volume.

Clients 125 may on occasion request that new volumes be added to aggregates in the storage infrastructure (e.g., so that those volumes can be used by the requesting client and/or additional clients). Volumes may be assigned to an aggregate for use by particular clients 125. For example, a first client may have access to a first volume on the first aggregate 175, while a second client may have no access to the first volume. Alternatively, volumes may be assigned to aggregates for use by particular applications, for storage of specified types of data, and so on.

The requests to provision storage (to add new volumes) are received and satisfied by the storage network manager 110, which manages the provisioning of new volumes to aggregates. Storage network manager 110 can determine which aggregates are best suited to hosting the newly requested volumes, and assign the volumes to the determined aggregates accordingly. Storage network manager 110 can determine how to carve up physical disk space to meet capacity, performance, security and efficiency requirements. Storage network manager 110 may also assign clients 125 to appropriate aggregates and/or storage servers, specify network paths between clients 125 and storage servers 105, 115, zone the network 120 to ensure access only to appropriate clients 125, and so on.

Storage network manager 110 may be requested to assign new volumes to aggregates without having any knowledge or only minimal knowledge about those volumes. For example, the storage network manager 110 may be requested to provision one or more volumes without knowing an expected use of the volume, a performance requirement of the volume, an expected load on the volume, and so on. In such situations, the storage network manager 110 may make predictions about the most load balanced manner in which to assign aggregates to the requested volumes even without information on the volume to be assigned. In one embodiment, such predictions are made based upon current performance and resource utilization levels of the aggregates and the storage servers hosting them. These metrics, and the relationship between these metrics, can provide valuable information in determining a load balanced distribution of volumes to aggregates.

In one embodiment, the storage network manager 110 includes a performance monitor 165 and a provisioner 170. Performance monitor 165 can gather information about usages of various resources in the storage infrastructure. For example, performance monitor 165 can maintain information about resource utilization of the storage devices (and thus the aggregates that include the storage devices) and the storage servers. Performance monitor 165 can then compare the usage information against performance capacity information determined for each resource to determine available performance capacities. The available performance capacities (differences between the performance capacities and the performance usages) can then be used to determine which aggregates to assign a new volume (or multiple new volumes) to.

Provisioner 170 can use the combined knowledge of resource utilizations and available performance capacities to determine how to provision volumes. The remaining available performance capacities for each aggregate can be used to determine an optimal aggregate from which to provision a volume. These scores can also be used to determine the number of volumes to be provisioned on multiple aggregates.

Figure 2:
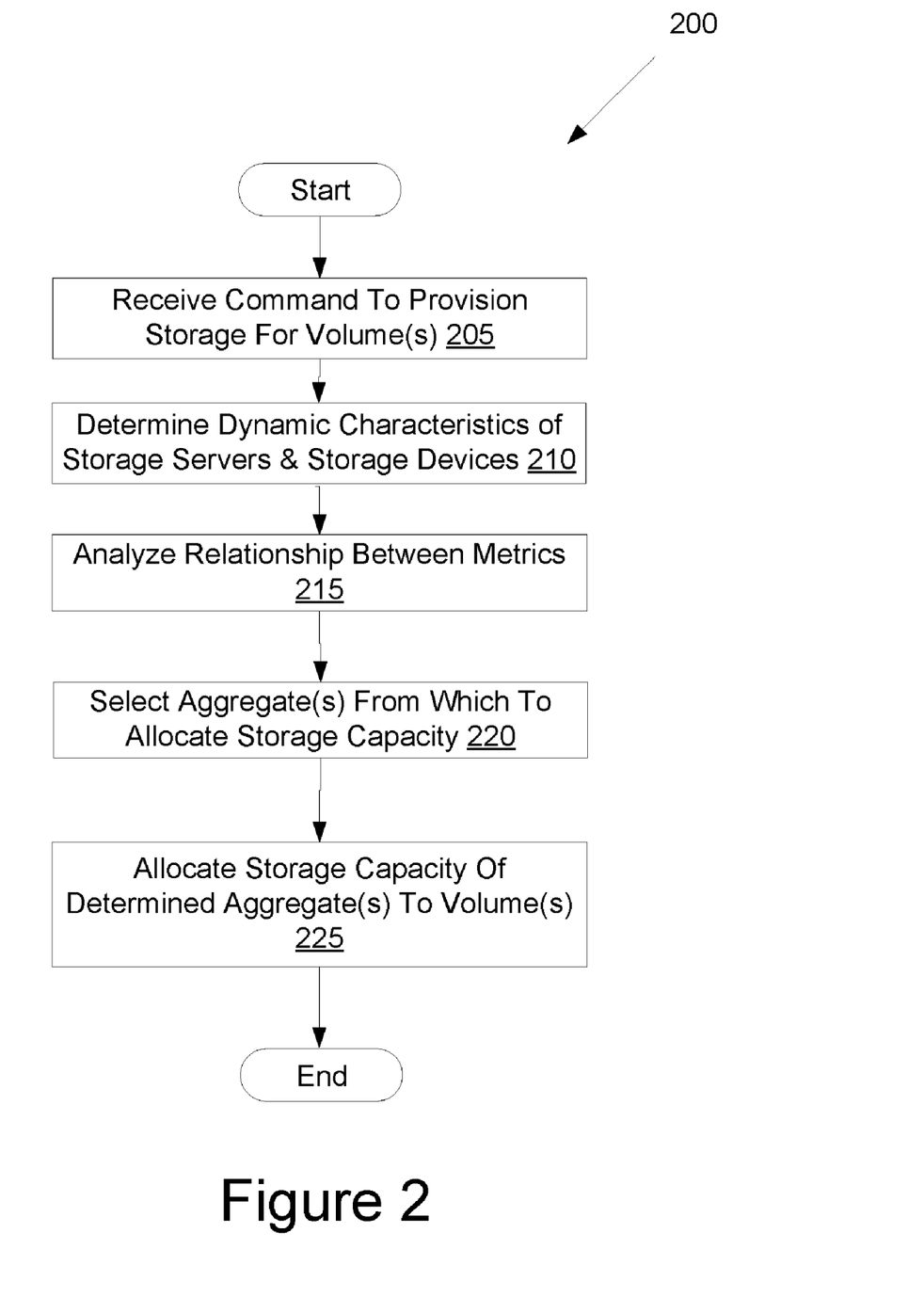
FIG. 2 is a flow diagram illustrating one embodiment of a process for provisioning storage to one or more volumes from a pool of aggregates.

FIG. 2 is a flow diagram illustrating one embodiment of a process 200 for provisioning storage to one or more volumes from a selection pool. The selection pool includes all aggregates considered in determining which aggregate a volume should be assigned to (e.g., all available aggregates). In one embodiment, process 200 is performed storage network manager of FIG. 1.

Referring to FIG. 2, process 200 receives a command to provision storage for one or more volumes (block 205). The command may be received by a storage network manager 110 from a client 125. In one embodiment, the command is received without any performance requirements of the volumes to be provisioned.

At block 210, dynamic characteristics of the storage servers and storage devices are determined. Dynamic characteristics include those characteristics that can change over time. These dynamic characteristics may be measured using metrics that can gauge available performance capacities of aggregates based on performance capacities of storage servers that host the aggregates and performance capacities of storage devices included in the aggregates. These metrics are described in greater detail below. In one embodiment, the dynamic characteristics (e.g., available performance capacities) are determined by a performance monitor 165.

At block 215, a relationship between the metrics is analyzed. Analyzing the relationship between the metrics may include calculating a combined metric score. In one embodiment, a combined metric score is calculated according to algorithm (7), which is described below in greater detail.

At block 220, aggregates from which to allocate storage capacity are determined. In one embodiment, in which only a single volume is to be provisioned, the aggregate that has a best combined metric score is assigned to the volume. In another embodiment, in which multiple volumes are to be provisioned, the number and/or percentage of volumes to assign to each aggregate is determined based on the relative combined metric scores of the available aggregates. The selection can be performed without having information about the volume or volumes to be provisioned. At block 225, storage capacity from the determined aggregates is allocated to the volume or volumes. The aggregates are approximately load balanced after the allocation. The method then ends.

Figure 3:
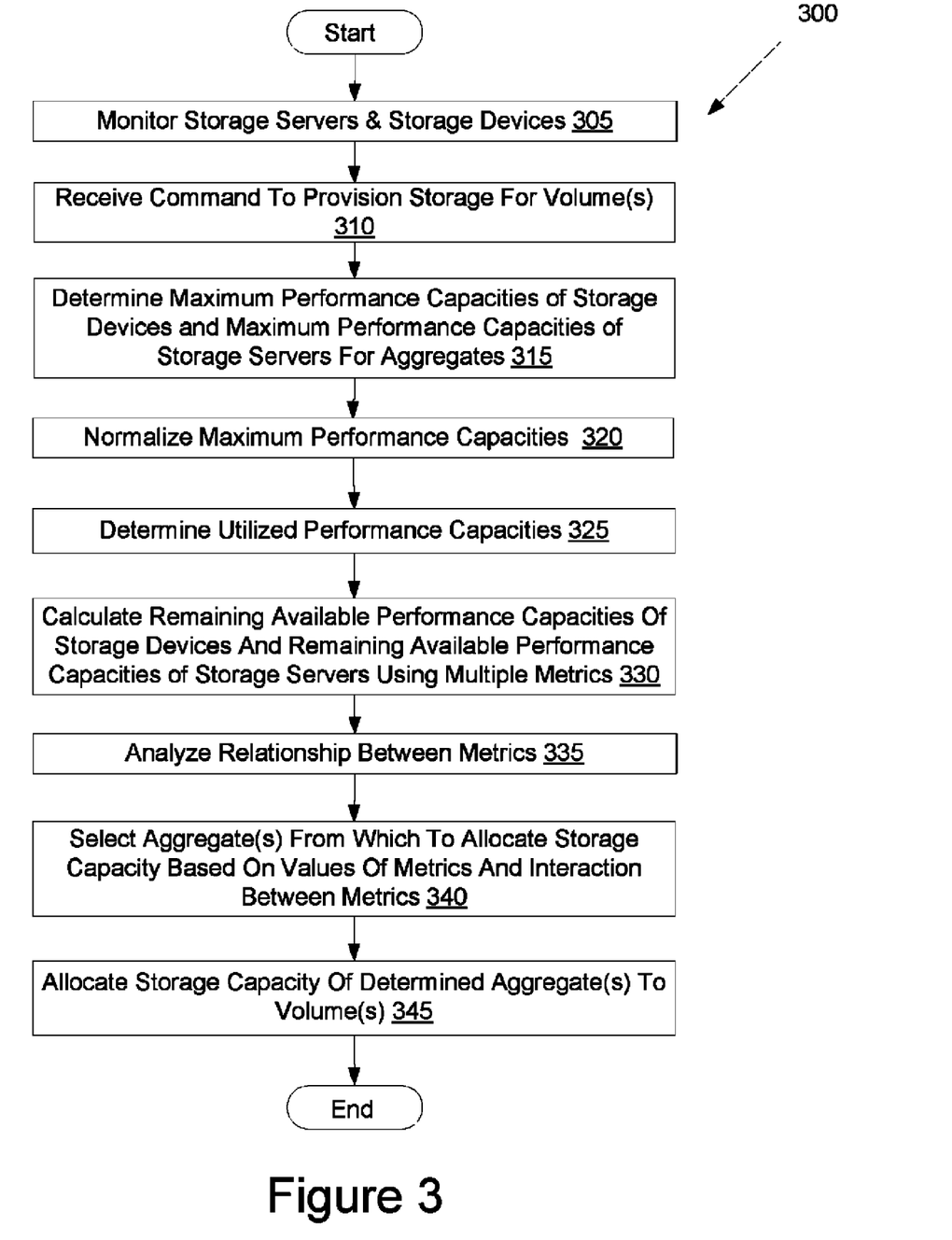
FIG. 3 is a flow diagram illustrating another embodiment of a process for provisioning storage to one or more volumes from a pool of aggregates.

FIG. 3 is a flow diagram illustrating another embodiment of a process 300 for provisioning storage to one or more volumes from a selection pool. In one embodiment, process 300 is performed by storage network manager of FIG. 1. In a further embodiment, process 300 is executed by one or both of performance monitor 165 and provisioner 170 of FIG. 1.

Referring to FIG. 3, process 300 monitors storage servers and storage devices (block 305). The storage servers and storage devices may be monitored for a predefined observation period. In one embodiment, the predefined observation period is long enough to capture traffic (e.g., storage device usage, storage server usage, network traffic, etc.) represented by a complete business cycle (e.g., 1 week for many industries). In one embodiment, the storage servers and storage devices are monitored by performance monitor 165.

At block 310, a command to provision storage for one or more volumes is received. The command may be received by a storage network manager 110 from a client 125. In one embodiment, the command is received without any information regarding performance requirements of the volumes to be provisioned.

At block 315, maximum performance capacities of storage devices and maximum performance capacities of storage servers are determined for the aggregates. Such a determination can be made by the performance monitor 165, and is described in greater detail below. Each aggregate is hosted by a storage server and includes one or more storage devices. At block 320, the maximum performance capacities are normalized. Normalization of storage devices includes dividing the maximum performance capacities of all storage devices by the maximum performance capacity of the storage device having the highest maximum performance capacity. Normalization of storage servers includes dividing the maximum performance capacities of all storage servers by the maximum performance capacity of the storage server having the highest maximum performance capacity. Normalization can be performed by the performance monitor 165.

At block 325, utilized performance capacities of the storage devices and storage servers are determined. In one embodiment, such a determination is made by the performance monitor 165. The performance monitor 165 may determine utilized performance capacities based on data obtained from monitoring the storage servers and storage devices. A detailed explanation of how utilized performance capacities are determined is discussed below.

At block 330, the remaining available performance capacities of storage devices and remaining available performance capacities of storage servers are calculated using multiple metrics. A first metric may be used to calculate the remaining available performance capacities of the storage servers and a second metric may be used to calculate the remaining available performance capacities of the storage devices. Determination and use of the first metric and second metric are discussed in greater detail below. Each value of the first metric and the second metric may be associated with a specific aggregate. The first metric may be associated with a storage server that hosts an aggregate, and the second metric may be associated with storage devices included in the aggregate. In one embodiment, the remaining available performance capacities are calculated by subtracting the determined utilized performance capacities from the maximum performance capacities. Remaining available performance capacities may be calculated by the performance monitor 165.

At block 335, a relationship between the metrics is analyzed. Analyzing the relationship between the metrics may include calculating a combined metric score. In one embodiment, a combined metric score is calculated according to algorithm (7), which is described below in greater detail.

At block 340, aggregates from which to allocate storage capacity are determined. This determination can be made without information about performance properties of the volume or volumes to be provisioned. In one embodiment, in which only a single volume is to be provisioned, the aggregate that has a best combined metric score is assigned to the volume. In another embodiment, in which multiple volumes are to be provisioned, the number and/or percentage of volumes to assign to each aggregate is determined based on the relative combined metric scores of the available aggregates. At block 345, storage capacity from the determined aggregates is assigned to the volume or volumes. After the assignment, the aggregates are approximately load balanced. The method then ends.

Referring back to FIG. 1, each storage server and each storage device has finite system resources. For example, each storage server has a processor or processors with specific powers, each storage device can handle a specific volume of input/output instructions per second (IOPS), each communication link between a storage device and a stored server and between a storage server and a client has a specific bandwidth, each storage server and each storage device has a specific amount of memory, and so on. It can be useful to know the performance capacity (maximum possible performance) of each system component.

In one embodiment, the performance monitor 165 determines performance capacity scores for each aggregate. The performance capacity scores for an aggregate may be based on the performance properties of the storage devices in the aggregate and/or the storage server that hosts it. The performance capacity scores identify a relative theoretical performance that can be delivered by resources associated with an aggregate (e.g., storage device, storage server, etc.).

In one embodiment, the performance monitor 165 determines two different metrics for each aggregate. The performance monitor 165 may determine a first performance capacity score that captures the combined performance capacity of the storage devices in an aggregate and a second performance capacity score that captures the performance capacity (e.g., processing or CPU capacity) of the storage server hosting the aggregate. Alternatively, more than two metrics can be considered. For example, front end network utilization capacity (e.g., maximum bandwidth between clients and storage servers) and a backend network utilization capacity (e.g., maximum bandwidth between storage servers and storage devices) may also be determined for each aggregate. Metrics can be stored in a data store (not shown) maintained by storage network manager 110 (e.g., a storage device attached to or included in storage network monitor 110) or networked to storage network monitor 110.

The potential for aggregate disk performance (combined potential of all storage devices in an aggregate) is a function of the number of storage devices in the aggregate and the performance potentials of those storage devices. In one embodiment, the disk performance potential represents the maximum number of input/output instructions (IOPS) that an aggregate can process. Alternatively, the disk performance potential may represent one or more of a bandwidth available to an aggregate, a cache memory of an aggregate, etc. Characteristics that may have a bearing on disk performance potential factors may also include read rate, write rate, latency, seek time, transfer rate, rotational speed, and so on.

To calculate the disk performance potential $P_d$ for an aggregate, the performance monitor 165 can determine a disk performance potential factor for each storage device in the aggregate (each type of storage device may have a different performance potential factor). A list of disk performance potential factors may be maintained by the performance monitor 165. Each entry in the list can include a device type (e.g., based on vendor, model number, etc.) of storage a device and a disk performance potential for that device type. The disk performance potential factors of the storage devices in an aggregate can then be summed to determine the disk performance potential $P_d$ for the aggregate. The disk performance potential $P_d$ of an aggregate can be calculated according to the following algorithm:

$$P_d = \sum_{i=0}^{n} P_i \tag{1}$$

Where $P_i$ is the performance potential factor for a specific storage device I in the aggregate. For example, the potential factor for a 5400 RPM SATA disk may be 0.50, the potential factor for a 7200 RPM SATA disk may be 0.75, the potential factor for a 10,000 RPM FCAL disk may be 1.00, the potential factor for a 15,000 RPM FCAL disk may be 1.32, and so on. If, for example, the first aggregate 175 included a 7200 RPM SATA disk and a 15,000 rpm FCAL disk, the disk performance potential $P_d$ for the first aggregate 175 would be 2.07.

Potential factors can be derived based on manufacturer provided data, benchmark results, lab measurements of performance data, etc. In one embodiment, potential factors are derived by comparing characteristics of a specified device to those of a reference device. Alternatively, potential factors may be derived by comparing the relative performance characteristics of all devices in the selection pool.

In one embodiment, the storage server performance potential $P_c$ represents the number of operations at the storage server can execute concurrently (e.g., the processor or CPU power). Alternatively, the storage server performance potential $P_c$ may represent the amount of memory (e.g., RAM) available to the storage server, or combination of CPU power and memory. The storage server performance potential may also be based on other measurable system resources of a storage server. The potential for storage server performance $P_c$ is based on the model, manufacturer and specifications of the storage server. For example, a low performing storage server may have a potential factor of 0.3, a middle performance storage server may have a potential factor of 1.0, and a high performance storage server may have a potential of 1.9. The performance monitor 165 may maintain a list of storage server performance potential factors. Each entry in the list can include a type of storage server and a storage server performance potential factor for that type.

Once the disk performance potentials $P_d$ and the storage server performance potentials $P_c$ have been determined for all aggregates, the disk performance $P_d$ potentials and the storage server performance potentials $P_c$ can be normalized. Normalization can be performed by dividing each aggregate's $P_d$ rating by the maximum $P_d$ rating (the $P_d$ rating of the aggregate having the highest $P_d$ rating) and dividing each aggregate's $P_c$ rating by the maximum $P_c$ rating (the $P_c$ rating of the aggregate having the highest $P_c$ rating) across all aggregates 0 to n in the selection pool (all available aggregates), as shown in the following algorithms:

$$P_{dn}[i] = p_d[i]/\max(P_d[0 \ldots n]) \tag{2A}$$

$$P_{cn}[i] = p_c[i]/\max(P_c[0 \ldots n]) \tag{2B}$$

where $P_{dn}$ is the normalized disk performance potential and $P_{cn}$ is the normalized storage server performance potential. The normalized values naturally fall between 0 and 1, and provide a relative rating of performance potential between all of the aggregates in the pool of available aggregates.

In one embodiment, performance monitor 165 calculates raw performance potentials (non-normalized performance potentials) and normalized performance potentials each time a request to provision a volume is received. Alternatively, raw performance potentials and/or normalized performance potentials may be stored and reused. In one embodiment, performance monitor 165 only recalculates raw performance potentials for aggregates that have changed (e.g., if a new storage device is added to an aggregate or an existing storage device is removed) since performance potentials were last calculated. In a further embodiment, performance monitor 165 recalculates normalized performance potentials only if the pool of aggregates has changed since performance potentials were last determined (e.g., if an aggregate has a new maximum $P_c$ and/or a new maximum $P_d$).

In one embodiment, performance monitor 165 calculates a used performance capacity for each aggregate. This can include determining a storage server utilization score $U_c$ for each storage server and disk utilization score $U_d$ for each storage device. In one embodiment, the storage server utilization score $U_c$ is dependent on the CPU utilization of the storage server. Alternatively, the storage server utilization score $U_c$ maybe dependent on other measurable system resources, such as random access memory (RAM) utilization. Utilization scores identify the representative utilization of the resources associated with an aggregate in such a way that the variations in the utilization of these resources over an observed period are factored into the scores. Moreover, the utilization scores should not be overly affected by abnormal or outlying usage values. For example, periods of unusually low or high traffic should not unduly affect the representative utilization of the resources.

To determine the utilization scores for an aggregate, performance monitor 165 monitors the storage server hosting the aggregate and the storage devices in the aggregate for a predefined time period. The period of observation may be preconfigured, or may be set by a system administrator. In one embodiment, aggregates are observed for a period of one week. A week represents a standard business cycle for many industries, and can provide sufficiently accurate average usage information. Alternatively, performance monitor 165 can be configured to observe aggregates for longer or shorter periods than one week to determine utilization scores. The total period of observation should be large enough to capture the variations in traffic to the system hosting the aggregate over a complete business cycle.

In one embodiment, in order to get reliable usage data for an aggregate, the aggregate is monitored for a full period (e.g., a full week). If data for a full period is not available for an aggregate, the aggregate may be disqualified from the selection pool. However, aggregates on a new system may not be removed from the selection pool even if a full period of data is not available for them. A new system is defined as a system that contains aggregates which have no active volumes other than the root volume.

In one embodiment, the entire observation period is divided into an appropriate number of equal sub-periods (e.g. a week's observation period may be divided into 7 days). A maximum averaged resource utilization over a moving window having a time interval m within each sub-period is then calculated. A first averaged resource utilization value is recorded. A moving window of the time interval is then maintained, and as time advances the average resource utilization value of the moving window is compared to the recorded average resource utilization value. If the average resource utilization of the moving window is higher than the recorded average resource utilization, then the recorded resource utilization is replaced. In one embodiment, at any instant the only resource utilization value stored is the maximum observed resource utilization over the moving windows. This can obviate a need to store an array of average utilizations.

If $Avg_w$ be the average resource utilization over time window w and $Avg_{w-1}$ the average resource utilization over the previous time window, then at the end of each time window w, the running maximum average stored $Avg_{max}$ can be determined as:

$$\text{if } (Avg_w > Avg_{max}) \; Avg_{max} = Avg_w; \tag{3}$$

Where, $Avg_{max}$ is initialized to the value of the average over the first time window as $Avg_{max} = Avg_1$. A separate $Avg_{max}$ value may be maintained for each storage device and each storage server in a sub-period. Thus, at the end of each sub-period p, a single value $Avg_{maxc-p}$ representing the maximum of the averages of storage server utilization for a storage server observed over all the moving time windows in that sub-period is obtained. Likewise, the maximum of averages of the disk utilization $Avg_{maxd-p}$ for each storage device observed over the moving time windows in the period is also obtained.

A storage server utilization score $U_c$ for an aggregate can then be computed as the median of the storage server utilization scores $Avg_{maxc-p}$ stored for each sub-period observed in the observation period. Similarly, the disk utilization score $U_d$ for the aggregate can be computed as the median of the disk utilization scores $Avg_{maxd-p}$ stored for each sub-period observed in the observation period. The storage server utilization score $U_c$ and the disk utilization scores $U_d$ for an aggregate can therefore be determined according to the following algorithms:

$$U_c = \text{median} \; (Avg_{maxc-1}, Avg_{maxc-2}, \ldots, Avg_{maxc-p}) \tag{4A}$$

$$U_{d-i} = \text{median} \; (Avg_{maxd-1}, Avg_{maxd-2}, \ldots, Avg_{maxd-p}) \tag{4B}$$

where a separate $U_d$ score is determined for each storage device i in an aggregate. The disk utilization score $U_{d-i}$ of the busiest disk in an aggregate can then be used as the disk utilization score $U_d$ for that aggregate, as shown in the following algorithm:

$$U_d = \max \; (U_{d-1}, U_{d-2}, \ldots, U_{d-i}) \tag{5}$$

Once the normalized performance potentials and resource utilizations are determined, these scores can be combined to determine remaining available storage server performance capacity (resource utilization) $S_c$ and disk performance capacity (resource utilization) $S_d$ for an aggregate. In one embodiment, the remaining available performance capacities ($S_c$ and $S_d$) are computed by taking the normalized performance potential for an aggregate's storage server and storage devices, and multiplying by one minus the calculated utilization factor ($U_c$ or $U_d$ as appropriate). This provides the unused performance potential (capacity) of the aggregate. The result will be a value between 0 and 1, with a higher number indicating more remaining performance capacity. To simplify later calculations, the remaining performance capacity may be subtracted from one so that a lower number indicates more performance capacity. Remaining storage server performance capacity and remaining storage device performance capacity can therefore be calculated according to the following algorithm:

$$S_c = 1 - (P_{cn} \cdot (1 - U_c)) \tag{6A}$$

$$S_d = 1 - (P_{dn} \cdot (1 - U_d)) \tag{6B}$$

In one embodiment, a new system should have its full performance potential available, and utilization of both storage server and storage devices can be assumed to be zero. However, setting utilizations to zero can have an impact on latter calculations, resulting in all volumes to be provisioned to the new aggregate. Therefore, the utilization of a new aggregate may be set to an arbitrarily low but non-zero value such as 0.1 or 0.01.

Provisioner 170 can use the combined knowledge of resource utilizations and available performance capacities to determine how to provision volumes. The remaining available performance capacities ($S_c$ and $S_d$) for each aggregate can be used to determine an optimal aggregate from which to provision a volume. These scores can also be used to determine the number of volumes to be provisioned on multiple aggregates.

Figure 4:
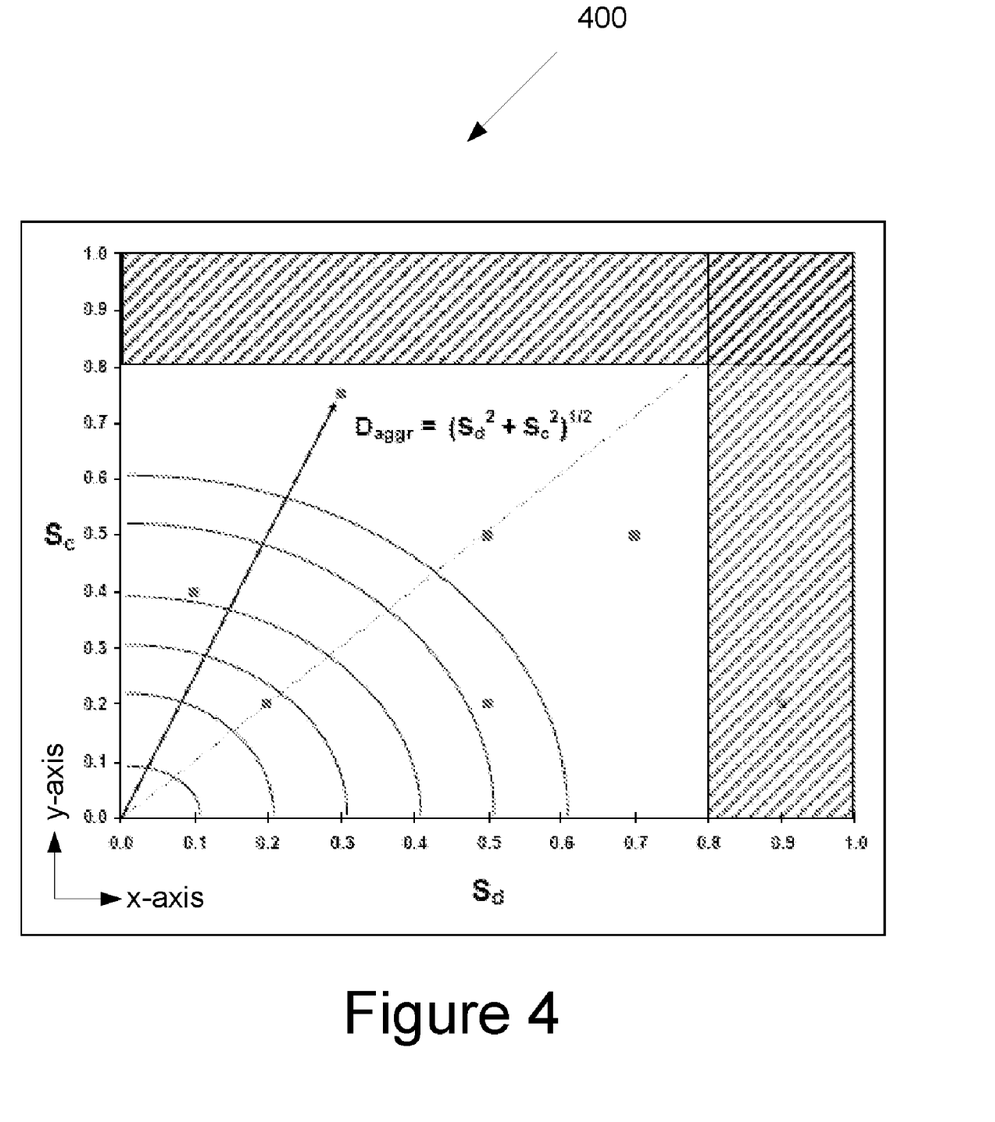
FIG. 4 illustrates a scatter plot showing relative remaining performance capacities for available aggregates in the selection pool.

An example of a relationship between two exemplary metrics is shown in FIG. 4. This relationship between the metrics, as well as the metrics themselves, can be used to determine optimal aggregates from which to provision a volume. FIG. 4 illustrates a scatter plot 400 showing two different remaining performance capacities for each available aggregate in a selection pool. As shown, the first metric is shown along the x-axis and a second metric is shown along the y-axis. If three metrics were used, the scatter plot would be a 3-dimensional scatter plot with the third metric along the z-axis. More than three metrics may also be used.

Referring to FIG. 4, the illustrated scatter plot shows remaining available disk performance capacity $S_d$ on the x-axis and remaining available storage server performance capacity $S_c$ on the y-axis. The aggregates with the highest remaining performance capacity are those closest to the origin.

Those aggregates having very little available storage server performance capacity (a very high $S_c$ value) or very little available disk performance capacity (a very high $S_d$ value) may be at or near maximum performance capacity. Therefore, an aggregate having a very high $S_d$ may function poorly even if the $S_c$ value is very low because the $S_d$ value acts as a bottleneck. Likewise, a very high $S_c$ value coupled with a low $S_d$ value is also undesirable. Therefore, aggregates having a high $S_d$ value and/or a high $S_c$ value are removed from consideration. In the illustrated embodiment, any aggregate having a storage server performance capacity or disk performance capacity value greater than 0.8 is considered too busy to accept additional load and therefore is removed from the selection pool. The hashed region on the scatter plot represents remaining storage capacity scores for which aggregates are removed from consideration. As illustrated, an aggregate having an $S_d$ value of 0.9 and an $S_c$ value of 0.2 is removed from consideration.

The distance from the origin provides a composite measure $D_{aggr}$ of performance capacity for each aggregate. This composite measure incorporates the $S_c$ metric, the $S_d$ metric, and a relationship between the $S_c$ metric and the $S_d$ metric. This measure can be used to produce relative rankings of the aggregates in the selection pool, and these rankings can be used to determine how volumes are assigned to the aggregates. The composite measure of performance capacity can be determined according to the algorithm:

$$D_{aggr} = (S_c^2 + S_d^2)^{1/2} \quad (7)$$

A maximum $D_{aggr}$ value of 1.0 represents an aggregate for which 100% of its performance capacity is being used. At the opposite extreme, a $D_{aggr}$ value of 0.0 represents an aggregate for which 0% of its performance capacity is being used. In one embodiment, the range of possible performance capacity values is divided into multiple bins, each bin representing a range of performance capacity values. Each aggregate having a $D_{aggr}$ value that falls into a bin may be treated as approximately equivalent. Each bin can be represented as a band in the scatter plot of FIG. 4. For example, a first band includes all aggregates having a $D_{aggr}$ score between 0.0 and 0.1, a second band includes all aggregates having $D_{aggr}$ scores between 0.1 and 0.2, and so on. In one embodiment, the bins are evenly distributed across the possible $D_{aggr}$ values. For example, as illustrated in FIG. 4, a first band is shown at 0.1, at 0.2, at 0.3 and so on. In an alternative embodiment, the bins are not evenly distributed. For example, referring to the scatter plot, the bands closer to the origin may be further apart than the bands further from the origin (e.g., a first been could include values 0.0 to 0.2, a second min could include values from 0.2 to 0.36, the third been could include values from 0.36 to 0.44, and so on). The area between the minimum and maximum performance capacities may also be divided, for example, logarithmically or exponentially.

To determine which aggregates to assign to one or more volumes, a $D_{aggr}$ value is computed for each aggregate. All aggregates can then be placed into different bins (shown as bands in FIG. 4). In some instances, it may be necessary to determine a single best aggregate from among multiple aggregates that fall into a single bin or band. For example, if a best aggregate to assign a single volume to is to be determined, and multiple aggregates fall within the same bin, it may be necessary to determine a tie breaker. In one embodiment, a single best aggregate within a bin or band is chosen by determining distance from the 45 degree line (i.e. the X=Y line). The aggregate that is closest to the 45 degree line would be the ideal choice since it represents the most balanced workload between the storage server and the storage devices in an aggregate. The distance to the 45 degree line can be computed as:

$$D_{45 degree} = |S_c - S_d| \quad (8)$$

where the smaller the value, the closer it is to the 45 degree line.

The distance computations for the aggregates can be used to determine how many volumes to place on each aggregate. If only one volume has to be placed, the aggregate in the lowest band and having the smallest $D_{45degree}$ value should be chosen. If more than one volume needs to be provisioned, and the number of volumes to assign to an aggregate can be determined according to the relative available performance capacities of the aggregates. In one embodiment, the number of volumes to assign to an aggregate is determined based on a bin or band that the aggregate is placed in. For example, any aggregates in a first band may be assigned two volumes, while any aggregates in a second band may be assigned one volume. Alternatively, each aggregate in the first band may be assigned 20% of the volumes, and each aggregate in the second band may be assigned 10% of the volumes. In another embodiment, a weighted round-robin approach is applied across a subset of aggregates. In yet another embodiment, the number of volumes V[a] to assign an aggregate 'a' in the selection pool is determined according to the following algorithm:

$$V_{raw}[a] = \left((D_{sum}/D_{aggr}[a])\right) \bigg/ \sum_{all\_a} (D_{sum}/D_{aggr}[a]) \cdot N \quad (9)$$

where N is the total number of volumes to be provisioned, A is the number of aggregates remaining in the selection pool, $D_{aggr}[0 \ldots A-1]$ represents the distance metrics for each aggregate in the selection pool, and $D_{sum}$ is the sum of all distance metrics for all aggregates in the selection pool. This algorithm determines a percentage of the total number of volumes to be assigned to each available aggregate. For example, assume that there are five volumes to be provisioned, and there are two available aggregates, one having a Daggr score of 0.2 and another having a Daggr score of 0.6. Applying the above algorithm would yield:

$$V_{raw}[aggr1] = ((0.8/0.2)/(4+1.3) \cdot 5 = 3.78 \quad (10A)$$

$$V_{raw}[aggr2] = ((0.8/0.6)/(4+1.3) \cdot 5 = 1.22 \quad (10B)$$

In one embodiment, a fraction of a volume may not be assigned to an angry. Therefore, they calculated number of volumes to assign to an agate is rounded to the nearest integer, as shown in the following algorithm:

$$V[a] = \text{ceiling}(V_{raw}[a]) \quad (11)$$

Therefore, in the previous example the number of volumes to assign to each aggregate would be as follows:

$$V[aggr1] = \text{ceiling}(3.78) = 4 \quad (12A)$$

$$V[aggr2] = \text{ceiling}(1.22) = 1 \quad (12B)$$

In one embodiment, volumes may be provisioned in multiple stages. If an additional set of volumes needs to be provisioned after the initial set has been provisioned but before any new aggregate data has been collected, the new volumes can be provisioned using the original aggregate data if a history of the previous provisioning has been maintained. The calculation for the number of additional volumes to provision to a particular aggregate can be performed by applying the inverse of the calculation used for the original provisioning, and then recalculating using the combined sum of both the number of original volumes already provisioned and the number of additional volumes to provision, as shown in the calculations below:

$$V_{raw}'[a] = (V_{raw}[a]/N) \cdot (N+N') \quad (13A)$$

$$V'[a] = \text{ceiling}(V_{raw}'[a]) - V[a] \quad (13B)$$

V'[a] represents the number of additional volumes should then be provisioned to aggregate 'a'.

The above embodiments describe how to assign aggregates to volumes based on performance potentials of storage devices and storage servers. Prior to performing the above described methods, a separate process may be used to determine the best placement for volumes amongst potential aggregates based on storage (amount of data) capacity. Alternatively, a separate process may be used to determine the best placement for volumes amongst potential aggregates based on storage after the above described methods are performed. For example, once the method described here determines the number of volumes to provision to a particular aggregate, another 'best storage fit' method could be used to determine which volumes to choose for each aggregate, based on size of the volume and the storage capacity of the aggregate. Alternatively, the above described methods may be modified to also take into consideration storage capacity of the aggregates and storage requirements of the volumes.

Figure 5:
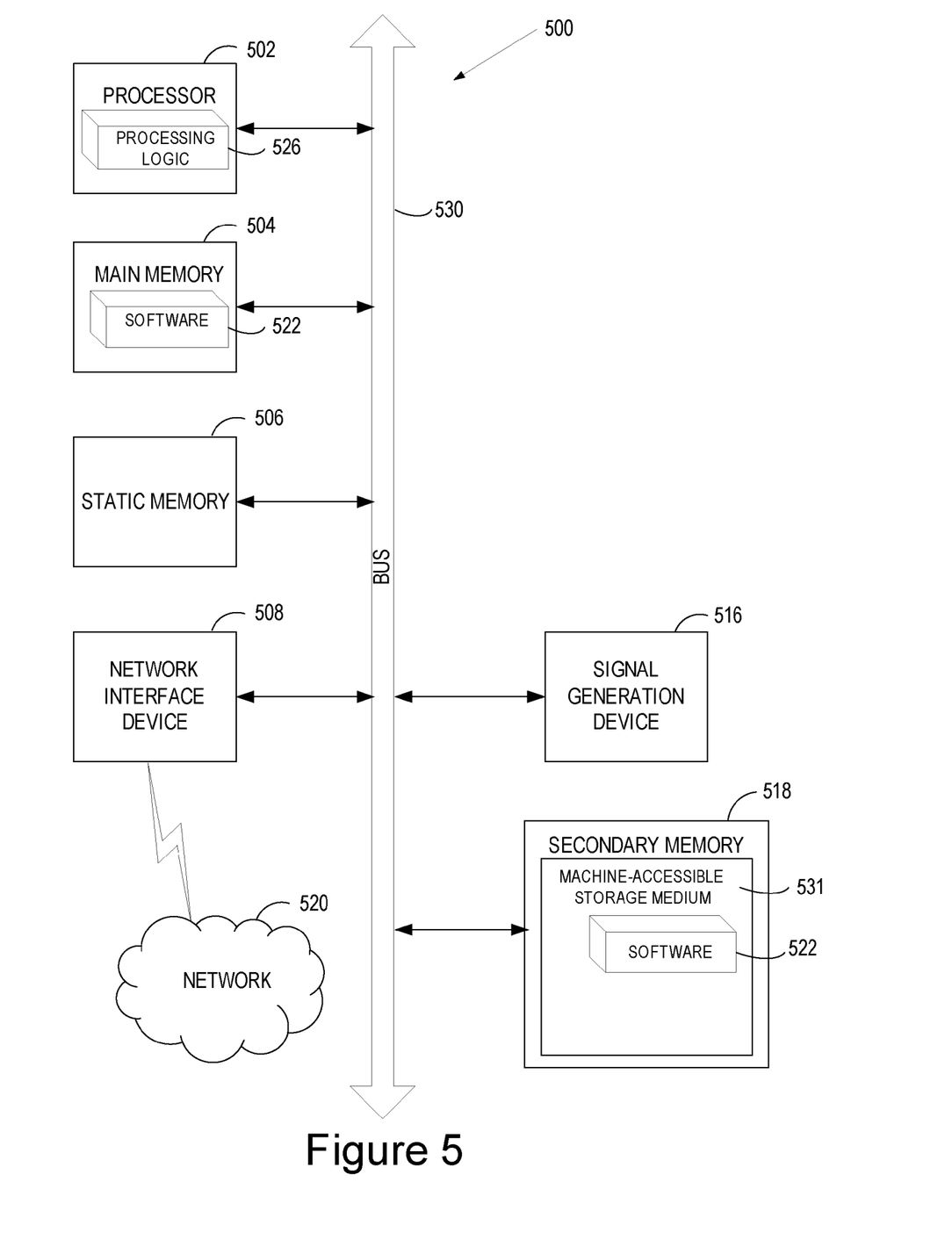
FIG. 5 illustrates a diagrammatic representation of a machine in the exemplary form of a computer system, in accordance with one embodiment of the present invention.

FIG. 5 illustrates a computer system 500, which may be representative of, for example, any of: a storage server 105, 115, a storage network manager 110 or clients 125 of FIG. 1. The computer system 500 may be connected (e.g., networked) to other machines in a LAN, an intranet, an extranet, or the Internet. The computer system 500 may operate in a client-server network environment, or as a peer machine in a peer-to-peer (or distributed) network environment. While only a single computer system 500 is illustrated, the term "computer system" shall also be taken to include any collection of computer systems that individually or jointly execute a set (or multiple sets) of instructions to perform any one or more of the methodologies discussed herein. The computer system may be a server, a personal computer, a mobile device, or any other device and may represent, for example, a front end server, a back end server, a client, a network appliance, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. For example, if the computer system 500 is a computer system of the storage network manager 110, software 522 may include performance monitor 165 and provisioner 170. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any mechanism for storing information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.). The term "machine-accessible storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computerized method for provisioning storage, the method comprising:
    determining available performance capacities of storage servers and storage devices in a storage infrastructure using a plurality of metrics, wherein each of the storage devices is managed by one of the storage servers;
    analyzing a relationship between the plurality of metrics;
    selecting an aggregate from which to assign storage capacity to a volume from a plurality of aggregates, the selecting being based on the available performance capacities of the storage servers and storage devices and the relationship between the plurality of metrics and being performed without information about performance properties of the volume being available, wherein unavailable performance properties include a load on the volume, a bandwidth requirement for the volume and an input/output instructions per second (IOPS) requirement for the volume, wherein the aggregate is hosted by a storage server and includes a plurality of storage devices; and
    automatically allocating storage capacity of the selected aggregate to the volume, wherein the plurality of aggregates are approximately load balanced after said allocating.

2. The method of claim 1, wherein the available server performance capacity is based on processor utilization of the storage server and available device performance capacity is based on disk utilization of the storage devices.

3. The method of claim 1, further comprising:
    determining an available server performance capacity for each of the storage servers;
    determining an available device performance capacity for each of the storage devices; and
    determining a total performance capacity for each of the aggregates based on the available device performance capacities for storage devices included in the aggregate and the available server performance capacity for a storage server that hosts the aggregate, wherein the aggregate from which to allocate storage capacity is selected based on total performance capacities of the plurality of aggregates.

4. The method of claim 3, wherein determining available performance capacities of storage servers and storage devices in the storage infrastructure comprises:

monitoring the storage servers and the storage devices in the storage infrastructure for a specified time period;

for each storage server, calculating the available server performance capacity includes determining standard resource utilization measurements of that storage server over the specified time period; and for each storage device, calculating the available device performance capacity includes determining standard resource utilization measurements of the storage device over the specified time period.

5. The method of claim 3, wherein:

the available server performance capacity is determined according to the algorithm, $S_c=1-(P_{cn}\cdot(1-U_c))$, where $S_c$ represents the available server performance capacity of the storage server, $U_c$ represents recorded performance data of the storage server and $P_{cn}$ represents a normalized maximum performance capacity for the storage server; and the available device performance capacity represents a combined performance capacity of storage devices included in the aggregate, the combined performance capacity being determined according to the algorithm, $S_d=1-(P_{dn}\cdot(1-U_d))$, where $S_d$ represents the available device performance capacity of the aggregate, $U_d$ represents recorded performance data of the storage devices and $P_{dn}$ represents a normalized maximum performance capacity for the storage devices.

6. The method of claim 5, wherein the total performance capacity is determined according to the algorithm, $D_{aggr}=(S_c^2+S_d^2)^{1/2}$, where $D_{aggr}$ represents the total performance capacity.

7. The method of claim 1, wherein the volume includes a plurality of volumes and the aggregate includes a plurality of aggregates, and wherein storage capacity from the plurality of aggregates is allocated to the plurality of volumes such that the plurality of aggregates are approximately load balanced.

8. The method of claim 7, wherein the storage capacity from the plurality of aggregates is allocated to a first set of volumes in a first stage, and the storage capacity from the plurality of aggregates is allocated to a second set of volumes in a second stage without re-determining the dynamic characteristics of the storage servers and the storage devices after allocating the storage capacity to the first set of volumes.

9. A computing apparatus comprising:

a memory including instructions for provisioning storage; and a processor, connected with the memory, to execute the instructions, wherein the instructions cause the processor to include:

a performance monitor to determine available performance capacities of storage servers and storage devices in a storage infrastructure using a plurality of metrics and to analyze a relationship between the plurality of metrics, wherein each of the storage devices is managed by one of the storage servers; and a provisioner to:

select an aggregate from which to allocate storage capacity to a volume from a plurality of aggregates, without having available information about performance properties of the volume, based on the available performance capacities and the relationship between the plurality of metrics, wherein unavailable performance properties of the volume include at least one of a bandwidth requirement for the volume and an input/output instructions per second (IOPS) requirement for the volume; and automatically allocate storage capacity of the selected aggregate to the volume, wherein the plurality of aggregates are approximately load balanced after said allocating.

10. The computing apparatus of claim 9, wherein the available server performance capacity is based on processor utilization of the storage server and the available device performance capacity is based on disk utilization of the storage devices.

11. The computing apparatus of claim 9, further comprising:

the performance monitor to determine an available server performance capacity for each of the storage servers, to determine an available device performance capacity for each of the storage devices, and to determine a total performance capacity for each aggregate based on the available device performance capacities for storage devices included in the aggregate and the available server performance capacity for a storage server that hosts the aggregate, wherein the aggregate from which to allocate storage capacity is selected based on total performance capacities of the plurality of aggregates.

12. The computing apparatus of claim 11, further comprising:

the performance monitor to monitor the storage servers and the storage devices in the storage infrastructure for a specified time period; and the provisioner to calculate for each storage server the value of the available server performance capacity by determining standard resource utilization measurements of that storage server over the specified time period, and to calculate for each storage device the available device performance capacity by determining standard resource utilization measurements of the storage device over the specified time period.

13. The computing apparatus of claim 11, wherein:

the available server performance capacity is determined according to the algorithm, $S_c=1-(P_{cn}\cdot(1-U_c))$, where $S_c$ represents the available server performance capacity of the storage server, $U_c$, represents recorded performance data of the storage server and $P_{cn}$ represents a normalized maximum performance capacity for the storage server; and the available device performance capacity represents a combined performance capacity of storage devices included in the aggregate, the combined performance capacity being determined according to the algorithm, $S_d=1-(P_{dn}\cdot(1-U_d))$, where $S_d$ represents the available device performance capacity of the aggregate, $U_d$ represents recorded performance data of the storage devices and $P_{dn}$ represents a normalized maximum performance capacity for the storage devices.

14. The computing apparatus of claim 13, wherein the total performance capacity is determined according to the algorithm, $D_{aggr}=(S_c^2+S_d^2)^{1/2}$, where $D_{aggr}$ represents the total performance capacity.

15. The computing apparatus of claim 9, wherein the volume includes a plurality of volumes and the aggregate includes a plurality of aggregates, and wherein the provisioner is configured to allocate storage capacity from the plurality of aggregates to the plurality of volumes such that the plurality of aggregates are approximately load balanced.

16. The computing apparatus of claim 15, wherein the storage capacity from the plurality of aggregates is allocated to a first set of volumes in a first stage, and the storage capacity from the plurality of aggregates is allocated to a second set of volumes in a second stage without re-determining the dynamic characteristics of the storage servers and the storage devices after allocating the storage capacity to the first set of volumes.

17. A computerized method for provisioning storage comprising:

monitoring a plurality of aggregates over a specified time period, each of the plurality of aggregates being hosted by a storage server and including a plurality of storage devices;

determining a resource utilization of each of the plurality of aggregates over the specified time period;

determining a maximum performance capacity for each of the aggregates;

calculating an available performance capacity for each of the aggregates by subtracting the resource utilization from the maximum performance capacity;

selecting a subset of the plurality of aggregates from which to allocate storage capacity to a plurality of volumes based on available performance capacities of the plurality of aggregates, wherein the subset is selected without information about performance properties of the plurality of volumes being available, wherein unavailable performance properties of the plurality of volumes include at least one of bandwidth requirements for the volumes and input/output instructions per second (IOPS) requirements for the volumes; and allocating storage capacity of the selected subset to the plurality of volumes, wherein the plurality of aggregates are approximately load balanced after said allocating.

18. The method of claim 17, wherein:

determining the resource utilization of an aggregate includes determining a server resource utilization of a storage server hosting the aggregate and determining device resource utilizations of storage devices included in the aggregate; and determining the maximum performance capacity for an aggregate includes determining a maximum server performance capacity of the storage server hosting the aggregate and determining maximum device performance capacities of the storage devices included in the aggregate.

19. The method of claim 17, wherein:

the available server performance capacity is determined according to the algorithm, $S_c=1-(P_{cn} \cdot (1-U_c))$, where $S_c$ represents the available server performance capacity of the storage server, $U_c$ represents recorded performance data of the storage server and $P_{cn}$ represents a normalized maximum performance capacity for the storage server; and the available device performance capacity represents a combined performance capacity of storage devices included in the aggregate, the combined performance capacity being determined according to the algorithm, $S_d=1-(P_{dn} \cdot (1-U_d))$, where $S_d$ represents the available device performance capacity of the aggregate, $U_d$ represents recorded performance data of the storage devices and $P_{dn}$ represents a normalized maximum performance capacity for the storage devices.

20. The method of claim 17, wherein the storage capacity from the plurality of aggregates is allocated to a first set of volumes in a first stage, and the storage capacity from the plurality of aggregates is allocated to a second set of volumes in a second stage without performing additional monitoring of the plurality of aggregates after the first stage is completed.

* * * * *